United States Patent [19]

Logan

[11] 3,869,741

[45] Mar. 11, 1975

[54] COMBINATION THREADING AND SCREW DRIVER TOOL

[76] Inventor: Noel Logan, 406 Waverly Rd., Barrington, Ill. 60010

[22] Filed: June 8, 1973

[21] Appl. No.: 368,230

[52] U.S. Cl. .......................... 7/17, 7/1 F, 145/50 A
[51] Int. Cl. .............................................. B25f 1/00
[58] Field of Search ......... 7/1 F, 17, 1 R; 145/50 R, 145/50 A, 50 B; 10/140

[56] References Cited
UNITED STATES PATENTS
74,490    2/1868    Bidwell ............................ 145/50 A 3,207,196    9/1965    Stillwagon, Jr. ......................... 7/1 F FOREIGN PATENTS OR APPLICATIONS
944,212    12/1963    Great Britain ....................... 10/140
530,788    7/1955    Italy ..................................... 10/140
22,524    11/1935    Australia ................................ 7/1 F
662,111    11/1951    Great Britain .......................... 7/1 F Primary Examiner—Al Lawrence Smith
Assistant Examiner—Roscoe V. Parker
Attorney, Agent, or Firm—Beverly A. Vandenburgh

[57] ABSTRACT

A screwdriver bit has a threaded portion forming a tap immediately adjacent the screw engaging end of the screwdriver.

1 Claim, 4 Drawing Figures

PATENTED MAR 11 1975          3,869,741
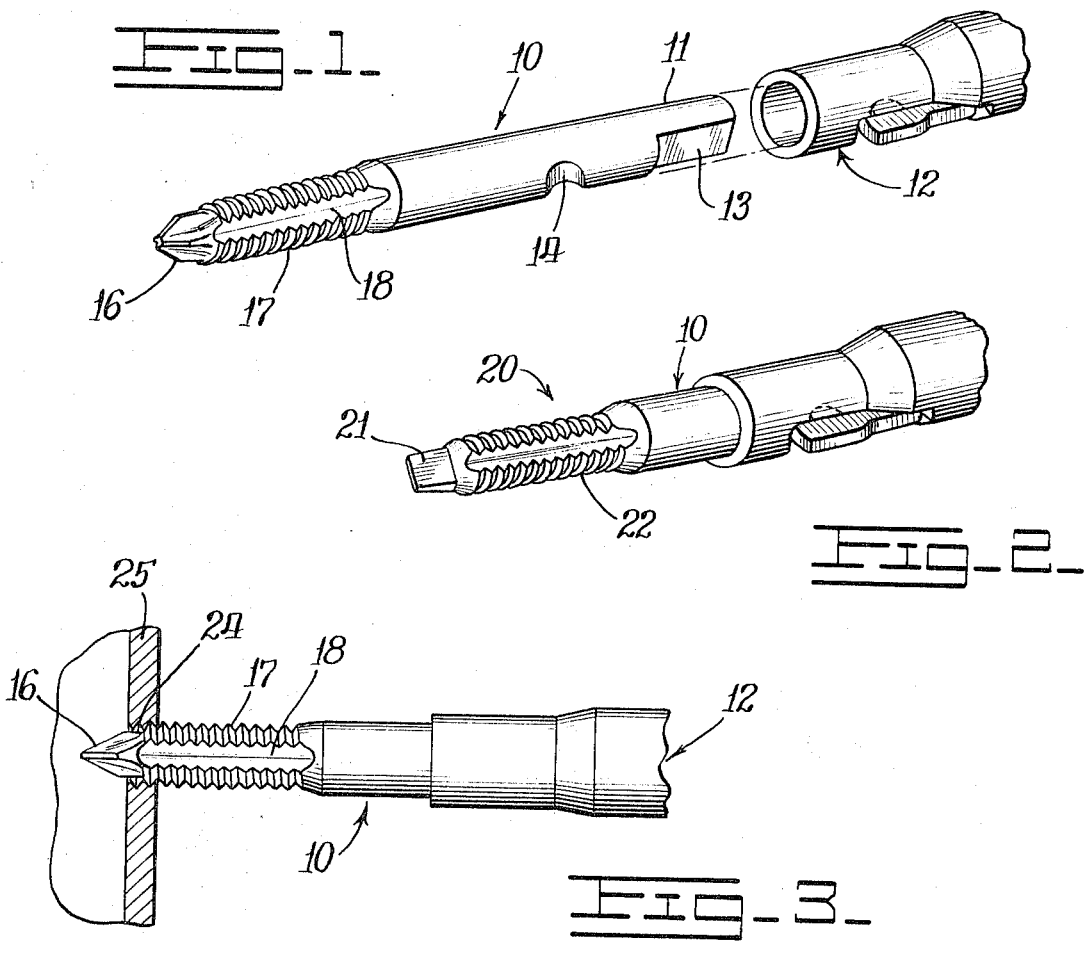
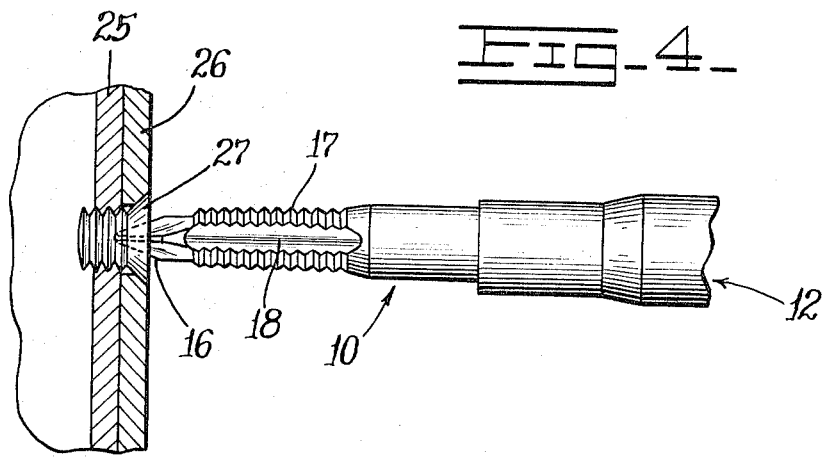

COMBINATION THREADING AND SCREW DRIVER TOOL

SUMMARY OF THE INVENTION

The present invention relates to a simple tool to facilitate the installing of screws in a pretapped member.

DESCRIPTION OF THE DRAWINGS

FIG. 1 is a perspective view of an embodiment of the invention;

FIG. 2 is a perspective view of an alternative embodiment;

FIG. 3 illustrates the use of the embodiment of FIG. 1 in preparing to install a screw; and FIG. 4 illustrates the use of the embodiment of FIG. 1 in installing a screw.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

FIG. 1 illustrates a screwdriver bit, generally 10. It has a proximal end 11 of the type to be received in a chuck, generally 12, of a suitable tool, for rotating the bit. To this end it has a flat 13 on the proximal end and a groove 14 immediately adjacent the proximal end. These are provided on bits for ratchet screwdrivers or drills such as those sometimes sold under the trademark "Yankee" and "Stanley" to enable the chuck to axially and rotationally engage the bit. As thus far described, the structure is conventional.

The distal end of the bit has a conformation 16 suitable for engaging a "Phillips" screw head. Immediately adjacent the proximal end is a portion having threads 17 thereabout along with axially aligned slots 18, thus forming a tap.

Other forms of screw engaging conformations may be employed, depending upon the requirements of the screws being used. Thus, in FIG. 2 there is a bit, generally 20, which has a blade 21 on the distal end for engaging screws with diametrically positioned slots across the heads thereof. Like the FIG. 1 embodiment, the bit 20 defines a tap 22 adjacent the distal end. One requirement for all such embodiments is that the maximum width, in a diametrical direction, of the screw engaging conformation (e.g., 16 or 21) must be no greater than the diametrical measurement of the roots of the threads, e.g., 17. The working part of the tool should be hardened, e.g., heat treated, carburized, etc.

There are numerous applications of a tool of the present invention. For example, in the new construction of commercial buildings it is common to use metal door frames. These frames will have been pretapped with holes suitable for holding the door hinges. At the completion of the frame manufacturing operation the frames will have been given a prime coat of paint or the like. Thus when it comes time to install the doors, the screw holes are very often clogged with paint. They also may become clogged with other materials, e.g., plaster, during the building erection operation and before the doors are to be hung.

The man given the task of installing the doors will find it extremely convenient to have a tool of the type disclosed herein available for that operation. Initially he would run the tap 17, 18 through the prethreaded opening 24 in the door frame 25. This would clean any debris from the threads so that the threads would be clean to easily accept the insertion of a screw. After the opening was cleaned out, the hinge 26 would be put in place and the screwdriver end of the same tool employed to affix a screw 27 in place to hold the hinge.

Both of these operations can quickly and easily be carried out with a ratchet type, axial movement screwdriver which would be holding the bit. However, the bit need not necessarily be made for this type of screwdriver. The proximal end could take other configurations to meet other holders. It could even have the conventional cylindrical handle of The type normally applied to hand held screwdrivers. It could be made to be used with power screwdrivers heads. Of course, the threads, e.g., 17 of the tap, would be of a size to fit the requirements of the particular job. Thus a member of similar tools would be marketed, each having a different thread size.

I claim:

1. In a screwdriver bit having a distal end and a proximal end with the distal end having a screw engaging configuration, the improvement comprising:
    said bit having a portion between said distal end and said proximal end with external threads and forming a tap, said threads having a root at least as large in diameter as the largest diametrical measurement of said configuration.

* * * * *